UNITED STATES PATENT OFFICE.

LEO H. BAEKELAND, OF YONKERS, NEW YORK, ASSIGNOR TO GENERAL BAKELITE COMPANY, OF NEW YORK, N. Y., A CORPORATION OF NEW YORK.

METHOD OF MAKING A PLASTIC BODY.

1,160,362.  Specification of Letters Patent.  Patented Nov. 16, 1915.

No Drawing.  Application filed October 2, 1909.  Serial No. 520,676.

*To all whom it may concern:*

Be it known that I, LEO H. BAEKELAND, a citizen of the United States, residing at Yonkers, in the county of Westchester and State of New York, have invented certain new and useful Improvements in Methods of Making a Plastic Body, of which the following is a specification.

In my prior patents (see for example U. S. Patents Nos. 939,966, November 16, 1909; 941,605, November 30, 1909; 942,699, December 7, 1909; and 942,808, December 7, 1909), and in my scientific and technical publications, (see Baekeland, March number, 1909, page 149, of the *Journal of Industrial and Engineering Chemistry*, published by the American Chemical Society, Easton, Pennsylvania; see also page 593 of the *Transactions of the American Electrochemical Society*, Volume XV, 1909, published by the American Electrochemical Society, Lehigh University, South Bethlehem, Pa.) I have described the manufacture of many useful articles containing infusible condensation products of formaldehyde and phenols. These substances work most advantageously in presence of fibrous bodies, either alone or in conjunction with other fillers. Such mixtures have heretofore been made either in pasty or in powdered form, but their preparation and subsequent use involves several serious technical difficulties. In the first case, where pasty mixtures are used, the material mixes with considerable difficulty and does not allow rapid and accurate molding, and the mixed pasty mass cannot be prepared long in advance, as it has a tendency to harden, especially in hot weather. In the case of dry powder grinding and mixing, the powdered material has a tendency to stick and melt or cake together, especially in summer time, or when large masses are ground or pulverized at one time. Furthermore, the powdered mixture is rather bulky and rather difficult to introduce rapidly into molds of restricted size. In order to obviate this latter objection, it is possible to compress the dry powdered mixture into sheets or masses of less bulk. But all these operations involve extra labor and considerable skill, and the success of proper molding depends very much on the way these preliminary treatments are carried out. I have found a simplification of considerable commercial and technical value, which consists in preparing this mixture wet, so as to make a kind of paper, or cardboard, out of it, or any such bodies which may facilitate molding. Instead of mixing and grinding the fibrous materials in a dry state with substances capable of yielding an infusible condensation product, I mix the fibrous materials in presence of water in suitable proportions with such substances, the water being afterward eliminated from the mass by a process of drying. The wet mixing or grinding can be accomplished in a "beater" as practised in the art of paper making, or in other suitable device. For this purpose, wood pulp, ground pulp, sulfite pulp, soda pulp, cellulose, asbestos, rags, cotton, linen, esparto grass, or in general, such fibrous materials as can be used for paper making, are finely divided and mixed in presence of water in suitable proportions, and with the substances designated above, namely, phenols and formaldehyde in proper proportion or their first reaction products, which under the action of heat and pressure, can furnish the infusible condensation products of formaldehyde and phenols, and are ground or beaten before or after. As starting point for the infusible condensation products of phenols and formaldehyde, I can use any suitable partial reaction products of same, either in liquid, in pasty or in solid form, or even a mixture of phenolic body with formaldehyde. Any of these can be used with or without the addition of suitable condensing agents. In the former case, I can use alkaline solutions of the phenols and formaldehyde mixture or of the partial reaction products of same, and the proportion of alkali used is not important or material, so long as any undesired excess thereof is eventually neutralized or eliminated by the addition of an acid or an acid salt or a suitable salt which by double decomposition eliminates the excess of alkali. Salts of aluminum, copper, iron, zinc, nickel, cobalt, and in general such salts as produce insoluble hydroxids in presence of alkaline solutions may be found to produce this effect. The addition of these salts for the elimination of excess of alkaline condensing agent has the further advantage of modifying the color of the product and of furnishing a suitable filler and sizing. Any of the above mentioned partial reaction products of phenols and formaldehyde, and more especially the liquid varieties of these, as well as the liquid mixture of phenols and formaldehyde, can be used alone or in conjunction with thickening materials, as for instance, starch and gelatinous bodies, which tend to emulsify or suspend them better.

By partial reaction products of phenols and formaldehyde I mean to designate any product resulting from the direct or indirect action of a phenolic body on formaldehyde or equivalent methylene-containing substances, and which under the suitable action of heat and pressure, can be converted directly or indirectly into a final, hard, infusible condensation product of phenols and formaldehyde. It is an advantageous feature of the present process that the beating in presence of water tends to eliminate from such partial reaction products any excess of uncombined phenols, the presence of which might be objectionable in the finished product.

By phenols, I desire to designate not only the first member of the phenol group, but all its homologues or phenolic bodies or mixtures thereof, which can replace phenol or cresol for this purpose. In my process, the formaldehyde can be replaced by its polymers or by such other substances as can, during, the reaction, engender or replace formaldehyde.

The mixture can be varied so as to contain suitable filling materials, like china clay, soap stone, pulverized mica, aluminum powder, or in fact, any suitable inorganic or organic fillers which may be desirable as increasing the technical virtue or appearance of the finished products, or which may simplify the manufacture or commercial treatment. For instance, a certain amount of pulverized final condensation product can be added. In the same way, coloring agents may be employed.

In some cases, it becomes desirable to add some sizing material, and for this purpose, any of the numerous sizing materials, which have been proposed, or which have been used, in paper making, can be resorted to, as for instance, starch, glue, resinous soaps, etc. Very appropriate sizing materials which can be used in the preparation of these plastic mixtures and also for general paper making purposes, are the initial reaction products of phenols and formaldehyde themselves, or alkaline solutions thereof. As explained above, I may use an alkaline solution of partial condensation products, or again, I may use an alkaline solution of the soluble, fusible condensation products of formaldehyde and phenols, described in my paper in the *Journal of Industrial and Engineering Chemistry*, (see August number, 1909, page 545 "On Soluble, Fusible Resinous Condensation Products of Phenols and Formaldehyde"). These alkaline solutions may be used alone or in conjunction with acids or suitable salts acting as condensing agents and added to the mass at any stage of the process of manufacture.

The most convenient and quickest way for drying the mass is to convert it into paper or a paper-like body.

I wish it to be understood that under the name of paper I have designated here, not only the thin flexible variety of paper, but also any variety of cardboard or pulp-board of any desired thickness or shape, whether the same be formed directly in thick sheets, or whether these be obtained by superposition of several thinner sheets of paper as commonly practised in the art of paper making.

As to suitable proportions, I find that these may be varied considerably according to the end in view. For instance, proportions as low as 5% of condensation product added to the paper mass, are sufficient for certain purposes, and proportions as high as 70% may in some cases be used, although the best proportions range from 15% to 50%.

The mass, after going through the usual operations as practised in the art of paper making, may be further submitted to any other treatment, as for instance, calendering; but in most cases, the paper prepared as above described can be used in its raw uncalendered state. This paper can be stored away indefinitely for future use; its ease of handling, freighting, transporting, cutting and shaping, make it an unusually excellent starting point for molding and forming all kinds of articles. This not only reduces the cost of manufacture but renders the methods of operation more regular and certain. The process of molding is hereby reduced to its very simplest expression, relieving the manufacturer of molded articles of all other chemical or preliminary operations, and merely restricting his skill to relatively easy manufacturing methods, which mainly consist in hot pressing this special paper in suitable molds or devices. For instance, in the manufacture of buttons, the sheets are simply pressed between hot plates so as to transform them into hard, finished sheets or blocks, from which afterward disks can be stamped or cut, or buttons can be turned on the lathe by means of suitable devices. Or again, the raw paper can directly be pressed in hot button molds. In either case, the application of heat and pressure not only gives shape to the articles, but transforms the lower condensation products of phenols and formaldehyde into the higher stages of condensation, which are infusible. The same process can be followed for the manufacture of knife handles, umbrella handles, billiard balls, pipe stems, trays, fancy articles, furniture, musical instruments, mechanical devices, boxes, trunks, etc.

In order to increase the gloss or appearance, the paper can be dusted over, or otherwise covered, with partial condensation products of phenols and formaldehyde, in a continuous superficial layer, or in powder form, either during the act of the manufacture of the paper, or any time afterward; or the molds or plates in which the paper is pressed, can be coated by dusting on, by sprinkling, or otherwise, these partial condensation products in powder form, or by applying them in any other condition.

Paper of different colors or of different composition may be mixed or combined together in various ways so as to obtain during the act of hot pressing, numerous fancy articles or technical results, as marbleizing, tortoise shell effects, mottling, etc.

Molded objects can thus be made, which can stand water, cold or boiling, solvents and most chemicals. They are in this respect superior to rubber, celluloid, shellac compositions, and in fact all plastics hitherto known.

My method can be carried out in the same way when using asbestos fiber instead of organic fiber, or suitable mixtures of asbestos fiber and organic fiber can be compounded, all this according to the special uses for which the paper is intended. For certain purposes, as for instance electrical insulators, it becomes advantageous to use as much inorganic material as possible to insure greater resistance to heat.

In certain cases where the pressed objects have to receive additional tensile strength, it is possible to introduce strengthening bodies, like metallic rods or wire, expanded metal, or tension members of any kind, and these can be embedded before or after the act of molding.

Instead of drying the mass in sheet form as practised in paper making, I can dry it in bulk or in any form whatsoever, for instance, tubes or other suitable shapes.

I do not claim specifically herein the method of making a paper-like product by adding a dissolved phenolic condensation product to wet paper pulp, and precipitating it thereon; nor do I claim the product thus prepared; such subject-matter being claimed in my divisional application Serial No. 22,140, filed April 17, 1915.

I claim:—

1. The method of making an insulating material, which consists in adding to paper pulp a phenolic condensation product which is transformable by heat into an infusible body, beating the mixture until the condensation product is distributed uniformly over the surface of the fibers comprising the pulp, separating the liquid, and thereafter subjecting the material to heat and pressure.

2. The method of making an insulating material, which consists in adding to paper pulp in suspension in a liquid a phenolic condensation product which is transformable by heat into an infusible body, beating the mixture until the condensation product is distributed uniformly over the surfaces of the fibers comprising the pulp, separating the liquid, and thereafter subjecting the material to heat and pressure.

In testimony whereof, I affix my signature in presence of two witnesses.

LEO H. BAEKELAND.

Witnesses:
H. S. TARBELL,
MARY L. SHORT.